US009341339B2

(12) United States Patent
Herbin et al.

(10) Patent No.: US 9,341,339 B2
(45) **Date of Patent: *May 17, 2016**

(54) LIGHTNG DEVICE HAVING A VENTILATED REFLECTOR HOUSING FOR MOTOR VEHICLE LAMP

(71) Applicant: Valeo Vision, Bobigny (FR)

(72) Inventors: Cyril Herbin, Potelle (FR); Olivier Grebert, Ronchin (FR)

(73) Assignee: Valeo Vision, Bobigny (FR)

( * ) Notice: Subject to any disclaimer, the term of this patent is extended or adjusted under 35 U.S.C. 154(b) by 243 days.

This patent is subject to a terminal disclaimer.

(21) Appl. No.: 14/045,132

(22) Filed: Oct. 3, 2013

(65) Prior Publication Data

US 2014/0104863 A1 Apr. 17, 2014

Related U.S. Application Data

(63) Continuation of application No. 12/899,627, filed on Oct. 7, 2010, now Pat. No. 8,550,679.

(30) Foreign Application Priority Data

Oct. 9, 2009 (FR) ..................................... 09 57072

(51) Int. Cl.

| | |
|---|---|
| ***B60Q 1/04*** | (2006.01) |
| ***F21V 29/00*** | (2015.01) |
| ***F21S 8/10*** | (2006.01) |

(52) U.S. Cl.

CPC ............. *F21S 48/335* (2013.01); *F21S 48/337* (2013.01)

(58) Field of Classification Search

CPC ... F21V 29/503; F21V 29/505; F21V 29/006; B01Q 1/00

See application file for complete search history.

(56) References Cited

U.S. PATENT DOCUMENTS

| | | | | |
|---|---|---|---|---|
| 1,340,261 | A * | 5/1920 | Thompson | 362/294 |
| 1,500,639 | A * | 7/1924 | Rekar | 362/294 |
| 1,637,786 | A * | 8/1927 | Rekar | 362/294 |
| 1,697,216 | A * | 1/1929 | Wuelker | 362/294 |
| 3,684,908 | A * | 8/1972 | Beese | 313/24 |
| 3,878,505 | A * | 4/1975 | Seibert | 362/294 |
| 5,457,616 | A | 10/1995 | Grigorescu et al. | |
| 5,609,407 | A | 3/1997 | Yanagihara et al. | |
| 6,283,614 | B1 * | 9/2001 | Okada et al. | 362/294 |
| 6,443,575 | B1 * | 9/2002 | Miyamoto et al. | 353/61 |
| 7,682,054 | B2 * | 3/2010 | Hsu et al. | 362/294 |
| 7,731,368 | B2 * | 6/2010 | Ghosh | 353/61 |
| 2003/0021120 | A1 * | 1/2003 | Teichgraeber et al. | 362/294 |
| 2006/0279711 | A1 * | 12/2006 | Yoshii et al. | 353/97 |
| 2011/0032491 | A1 * | 2/2011 | Tsai et al. | 362/294 |

FOREIGN PATENT DOCUMENTS

| | | |
|---|---|---|
| DE | 10101005 | 7/2002 |
| EP | 0579555 | 1/1994 |
| EP | 1437546 | 7/2004 |
| FR | 2525165 | 10/1983 |

* cited by examiner

*Primary Examiner* — Ismael Negron

(74) *Attorney, Agent, or Firm* — Jacox, Meckstroth & Jenkins

(57) ABSTRACT

A reflector housing that includes a reflective inner surface, a neck portion defining a substantially cylindrical cavity with a rear opening in which a light source can be fitted to the housing, and a ventilation duct extending radially from the cavity and having a ventilation hole opening into the rear opening of the housing.

22 Claims, 1 Drawing Sheet

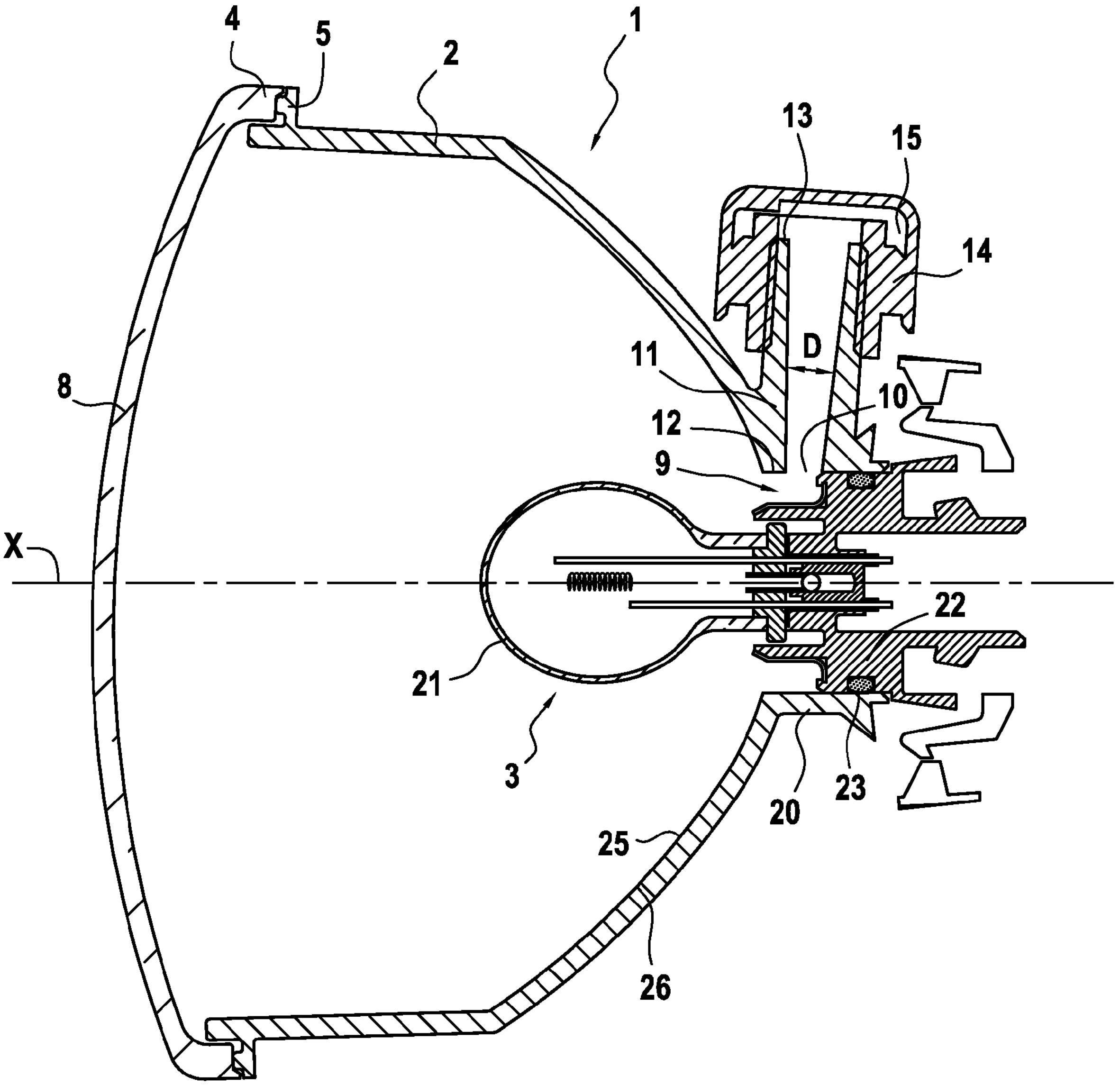
1
2
4
5
13
15
14
11
D
10
12
9
8
X
22
21
3
20
23
25
26

LIGHTNG DEVICE HAVING A VENTILATED REFLECTOR HOUSING FOR MOTOR VEHICLE LAMP

CROSS-REFERENCE TO RELATED APPLICATIONS

This application is a continuation of U.S. patent application Ser. No. 12/899,627, filed Oct. 7, 2010, now issued as U.S. Pat. No. 8,550,679, which claims priority to French Application No. 0957072 filed Oct. 9, 2009.

BACKGROUND OF THE INVENTION

1. Field of the Invention

The invention relates in particular to a motor vehicle lighting and/or signalling device.

2. Description of the Related Art

Due to U.S. Pat. No. 5,609,407, a light device is known comprising a housing provided with a ventilation hole communicating with the inside of this housing. In one of the examples described in this patent, the ventilation hole faces a plate forming a reflector. In another example in this patent, the ventilation hole opens onto a reflecting surface formed by a coating on the inside of the housing, this hole then being visible when the front of the device is viewed.

EP 579 555 and its corresponding U.S. Pat. No. 5,457,616 disclose ventilation means.

What is needed, therefore, is a system and method for improving the aesthetics of the device without increasing its complexity.

SUMMARY OF THE INVENTION

The invention is particularly intended for improving the aesthetics of a light device, but without increasing its complexity.

Therefore, one object of the invention is a motor vehicle lighting and/or signalling device, this device comprising:

- a housing comprising a rear opening in which a light source can be fitted to the housing; and
- a ventilation hole opening into the rear opening of the housing.

Due to one embodiment of the invention, the ventilation hole can be made invisible from the front of the device, in particular when the latter is viewed along the optical axis, without having recourse to additional parts such as a cover, for example.

With this, it is possible to improve the aesthetics of the device while maintaining effective ventilation inside the housing, this effectiveness being made possible by a circulation of air in close proximity to the light source.

Preferably, the ventilation hole opens radially into the rear opening of the housing.

Thus an observer, viewing the device from the front, would only see the rear opening of the housing, not the ventilation hole. Furthermore, this hole is masked by the light source placed in the rear opening.

Advantageously, the device comprises a ventilating duct forming, at one of its ends, the ventilation hole.

In an example of the invention, the device has an optical axis and the ventilating duct runs obliquely relative to the optical axis, i.e. in a manner not parallel to this optical axis.

Preferably, the ventilating duct runs in a manner substantially perpendicular to the optical axis, which may be advantageous with regard to the dimensions of the device.

In an example of the invention, the ventilating duct is of an inside diameter which increases as the duct runs further away radially from the optical axis.

If desired, the ventilating duct comprises an end receiving a cap, made of plastic for example and arranged to allow air to pass through the ventilating duct.

Advantageously, the cap defines an air circulation channel between the outside and the ventilating duct.

If necessary, the ventilation hole is made in one piece with the housing.

Advantageously, the ventilating duct is made in one piece with the housing.

In an example of the invention, the housing comprises a rear neck, which is in particular substantially cylindrical, adjacent to the rear opening receiving the light source and the ventilation hole is formed at least partially on this rear neck.

By way of an example, the light source comprises a bulb fitted to a bulb holder, which is fitted in the rear opening of the housing.

The ventilation hole is preferably directly opposite the bulb holder.

If necessary, a gasket is placed between the bulb holder and the housing.

In an example of the invention, the device comprises a reflector formed in particular by a reflecting coating deposited on an internal surface of the housing.

The ventilation hole is preferably distant from the reflector.

By way of an example, the housing is of a shape which is substantially generated by rotation about the optical axis.

The device can form, for example, a fog lamp or a DRL ('Daytime Running Light').

The invention may be understood better when the detailed description below of a non-limiting example of the invention is read and when the attached drawing is examined, in which:

BRIEF DESCRIPTION OF THE ACCOMPANYING DRAWINGS

FIG. 1 shows, schematically and partially, in cross section, a device according to an example of the invention.

DETAILED DESCRIPTION OF THE PREFERRED EMBODIMENTS

There has been shown in FIG. 1 a motor vehicle lighting and/or signalling device 1, this device 1 having an optical axis X and comprising:

- a housing 2, made of plastic for example, arranged to receive a light source 3, a filament lamp for example;
- a lens 8 arranged to close the housing 2, this lens 8 comprising an assembly part 4 arranged to co-operate with an assembly part 5, a flange for example, of the housing 2;
- a rear opening 9 of the housing 2 in which the light source 3 is fitted to the housing 2; and
- a ventilation hole 10 opening into the rear opening 9 of the housing 2.

The ventilation hole 10 opens radially into the said rear opening 9 of the housing 2.

The device 1 comprises a ventilating duct 11 forming, at one of its ends 12, the ventilation hole 10.

The ventilating duct 11 runs obliquely relative to the optical axis X, i.e. in a manner not parallel to this optical axis.

In the example described, the ventilating duct 11 runs in a manner substantially perpendicular to the optical axis X.

The ventilating duct 11 is of an inside diameter D which increases as the duct runs further away radially from the optical axis X.

The ventilating duct 11 comprises an end 13 receiving a cap 14 arranged to allow air to pass through the ventilating duct 11.

The cap 14 defines an air circulation channel 15 between the outside and the ventilating duct 11.

The ventilation hole 10 is made in one piece with the housing 2.

The ventilating duct 11 is made in one piece with the housing 2.

The housing 2 comprises a rear neck 20, which is in particular substantially cylindrical, adjacent to the rear opening 9 receiving the light source 3 and the ventilation hole 10 is formed on this rear neck 20.

The light source 3 comprises a bulb 21 fitted to a bulb holder 22, which is fitted in the rear opening 9 of the housing 2.

The ventilation hole 10 directly faces the bulb holder 22.

A gasket 23 is placed between the bulb holder 22 and the housing 2.

The housing 2 comprises a reflector 25 formed by a reflecting coating deposited on an internal surface 26 of the housing 2.

The ventilation hole 10 is distant from the reflector 25.

The housing 2 is of a shape which is substantially generated by rotation about the optical axis X.

In the example, the device forms a fog lamp or a DRL (Daytime Running Light).

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An illumination device for a motor vehicle, the illumination device comprising:
- a light source;
- a housing comprising a rear opening for receiving said light; and
- a ventilation hole opening into said rear opening of the housing;
- said ventilation hole not being visible to an observer viewing the illumination device along an optical axis of the illumination device after it is mounted to the motor vehicle;
- the illumination device emitting light through a lens and away from the motor vehicle to perform at least one of lighting or signaling outside the motor vehicle when the illumination device is mounted on the motor vehicle.

2. The illumination device for a motor vehicle according to claim 1, wherein the ventilation hole opens radially into said rear opening of the housing.

3. The illumination device for a motor vehicle according to claim 1, wherein the ventilation hole is made in one piece with the housing.

4. The illumination device for a motor vehicle according to claim 1, wherein the housing comprises a substantially cylindrical rear neck adjacent to said rear opening, and wherein the ventilation hole is formed at least partially on the rear neck.

5. The illumination device for a motor vehicle according to claim 1, wherein the shape of the housing is substantially generated by rotation about an optical axis of the illumination device.

6. The illumination device for a motor vehicle device according claim 1, wherein the illumination device is one of a fog lamp or a DRL.

7. The illumination device for a motor vehicle according to claim 1, wherein said ventilation hole forms one end of a ventilating duct.

8. The illumination device for a motor vehicle according to claim 7, wherein the ventilating duct runs in a manner substantially perpendicular to an optical axis of the illumination device.

9. The illumination device for a motor vehicle according to claim 1, further comprising a reflector formed by depositing a reflector coating on an internal surface of the housing.

10. The illumination device for a motor vehicle according to claim 9, wherein the ventilation hole is distant from the reflector.

11. An illumination device for a motor vehicle, the device comprising:
- a light source;
- a housing comprising a rear opening for receiving the light source;
- a ventilation hole opening into said rear opening of the housing; and
- a ventilating duct, said ventilation hole forming one end of said ventilating duct, said ventilating duct running in a manner substantially perpendicular to an optical axis of the illumination device;
- said ventilation hole not being visible to an observer viewing the illumination device along an optical axis of the illumination device after it is mounted to the motor vehicle;
- the illumination device emitting light through a lens and away from the motor vehicle to perform at least one of lighting or signaling outside the motor vehicle when the illumination device is mounted on the motor vehicle.

12. The illumination device for a motor vehicle device according to claim 11, wherein the shape of the housing is substantially generated by rotation about an optical axis of the illumination device.

13. The illumination device for a motor vehicle device according claim 11, wherein the illumination device is one of a fog lamp or a DRL.

14. The illumination device for a motor vehicle according to claim 11, wherein the housing comprises a substantially cylindrical rear neck adjacent to said rear opening, and wherein the ventilation hole is formed at least partially on the rear neck.

15. The illumination device for a motor vehicle device according to claim 14, further comprising a reflector formed by depositing a reflector coating on an internal surface of the housing.

16. The illumination device for a motor vehicle device according to claim 11, further comprising a reflector formed by depositing a reflector coating on an internal surface of the housing.

17. The illumination device for a motor vehicle device according to claim 16, wherein the ventilation hole is distant from the reflector.

18. The illumination device for a motor vehicle according to claim 11, wherein the ventilation hole is made in one piece with the housing.

19. The illumination device for a motor vehicle device according to claim 18, wherein the housing comprises a substantially cylindrical rear neck adjacent to said rear opening, and wherein the ventilation hole is formed at least partially on the rear neck.

20. The illumination device for a motor vehicle device according to claim 18, further comprising a reflector formed by depositing a reflector coating on an internal surface of the housing.

21. The illumination device for a motor vehicle according to claim 18, wherein the ventilation hole is made in one piece with the housing.

22. The illumination device for a motor vehicle device according to claim 21, wherein the housing comprises a substantially cylindrical rear neck adjacent to said rear opening, and wherein the ventilation hole is formed at least partially on the rear neck.

* * * * *